United States Patent [19]
De Caluwé et al.

[11] Patent Number: 5,539,802
[45] Date of Patent: Jul. 23, 1996

[54] SYSTEM FOR TESTING THE BILLING FUNCTION IN A TELECOMMUNICATION SYSTEM

[75] Inventors: Iwar De Caluwé; Mark A. Hensbergen; Gregorius B. Huitema; Jaap Kleerebezem; Geert J. Meijer, all of Groningen; Kornelis E. Pol, Winsum, all of Netherlands

[73] Assignee: Koninklijke Ptt Nederland N. V., Netherlands

[21] Appl. No.: 170,036

[22] Filed: Dec. 20, 1993

[30] Foreign Application Priority Data

Jan. 8, 1993 [NL] Netherlands ............... 9300036

[51] Int. Cl.⁶ ............... H04M 3/08; H04M 3/22
[52] U.S. Cl. ............... 379/13; 375/14; 375/15
[58] Field of Search ............... 379/10, 9, 1, 13, 379/14, 15, 16, 17, 18; 370/13

[56] References Cited

U.S. PATENT DOCUMENTS

| | | | |
|---|---|---|---|
| 4,680,784 | 7/1987 | Lehnert et al. ............ | 379/11 |
| 4,839,916 | 6/1989 | Fields et al. ............ | 375/13 |
| 5,065,422 | 11/1991 | Ishikawa ............ | 375/11 |
| 5,369,680 | 11/1994 | Borbes et al. ............ | 379/13 X |

FOREIGN PATENT DOCUMENTS

| | | |
|---|---|---|
| B50137/90 | 6/1992 | Australia. |
| 0184883 | 11/1985 | European Pat. Off. . |
| 3215672 | 8/1983 | Germany. |
| 3212006 | 10/1983 | Germany. |
| 3212019 | 11/1983 | Germany. |
| 61101157 | 5/1986 | Japan. |

OTHER PUBLICATIONS

W. Johner (Local Calls Simulator, Electrical Communication) 1980.

*Primary Examiner*—Stephen Chin
*Assistant Examiner*—Paul Loomis
*Attorney, Agent, or Firm*—Michaelson & Wallace; Peter L. Michaelson; John C. Pokotylo

[57] ABSTRACT

Test system for testing a telecommunication system (1) for reliability of the usage billing. A number of simulation units (8) is connected via normal subscriber lines (7). Each includes a control unit (9) which is controlled by a control program (13) with a number of program steps (1 ... n). Each of these includes a start code (S1 ... Sn). A program step is executed after the control unit detects a start code signal (SCS) which is identical to the start code valid for that program step. Simultaneously, the corresponding program steps in the other simulation units are executed, which simulates the simultaneous behavior of different subscribers. In all the simulation units, the start code signals and the various start codes are identical to one another. Preferably, the program start codes and the start code signal comprise a time code. The start code signal can be an externally generated radio signal, such as the DCF77 radio time signal.

14 Claims, 4 Drawing Sheets

```
PC1,2,3
```

TESTSCENARIO 1:
  PC1:S1;0;WDi;D(PC2);WBu;N;X
  PC2:S1;WBe;0;W30;N;X;Q
  PC3:S1;X

TESTSCENARIO 2:
  PC1:S2;0;WDi;D*21*(PC2)888#;N;W5;0;WDi;D(PC1);WBu;N;X;
  PC2:S2;WBe;0;;W10;N;X;Q
  PC3:S2;X

TESTSCENARIO 3:
  PC1:S3;0;WDi;D(PC2);WR3990;N;X
  PC2:S3;WR4000;0;W10;N;X;Q
  PC3:S3;X

TESTSCENARIO 4:
  PC1:S4;WDi;D(PC3);W200;N;X
  PC2:S4;0;WDi;D(PC3);W500;N;X
  PC3:S4;WBe;0;W530;N;X;Q

TESTSCENARIO n:
  PC1:Sn; ----------------------
  PC2:Sn; ----------------------
  PC3:Sn; -----------------

TESTSCENARIO 1:
  >PC1:S1;0;WDi;D(PC2);WBu;N;X
  PC2:S1;WBe;0;W30;N;X;Q
  PC3:S1;X

TESTSCENARIO 2:
  >PC1:S2;0;WDi;D*21*(PC2)888#;N;W5;0;WDi;D(PC1);WBu;N;X;
  PC2:S2;WBe;0;;W10;N;X;Q
  PC3:S2;X

TESTSCENARIO 3:
  >PC1:S3;0;WDi;D(PC2);WR3990;N;X
  PC2:S3;WR4000;0;W10;N;X;Q
  PC3:S3;X

TESTSCENARIO 4:
  >PC1:S4;WDi;D(PC3);W200;N;X
  PC2:S4;0;WDi;D(PC3);W500;N;X
  PC3:S4;WBe;0;W530;N;X;Q

TESTSCENARIO n:
  >PC1:Sn; ----------------------
  PC2:Sn; ----------------------
  PC3:Sn; -----------------

| TESTSCENARIO 1: |
| --- |
|   PC1:S1;0;WDi;D(PC2);WBu;N;X |
| >PC2:S1;WBe;0;W30;N;X;Q |
|   PC3:S1;X |

| TESTSCENARIO 2: |
| --- |
|   PC1:S2;0;WDi;D*21*(PC2)888#;N;W5;0;WDi;D(PC1);WBu;N;X; |
| >PC2:S2;WBe;0;;W10;N;X;Q |
|   PC3:S2;X |

| TESTSCENARIO 3: |
| --- |
|   PC1:S3;0;WDi;D(PC2);WR3990;N;X |
| >PC2:S3;WR4000;0;W10;N;X;Q |
|   PC3:S3;X |

| TESTSCENARIO 4: |
| --- |
|   PC1:S4;WDi;D(PC3);W200;N;X |
| >PC2:S4;0;WDi;D(PC3);W500;N;X |
|   PC3:S4;WBe;0;W530;N;X;Q |

| TESTSCENARIO n: |
| --- |
|   PC1:Sn; ---------------------- |
| >PC2:Sn; ---------------------------- |
|   PC3:Sn; ------------------ |

| TESTSCENARIO 1: |
| --- |
|   PC1:S1;0;WDi;D(PC2);WBu;N;X |
|   PC2:S1;WBe;0;W30;N;X;Q |
| >PC3:S1;X |

| TESTSCENARIO 2: |
| --- |
|   PC1:S2;0;WDi;D*21*(PC2)888#;N;W5;0;WDi;D(PC1);WBu;N;X; |
|   PC2:S2;WBe;0;;W10;N;X;Q |
| >PC3:S2;X |

| TESTSCENARIO 3: |
| --- |
|   PC1:S3;0;WDi;D(PC2);WR3990;N;X |
|   PC2:S3;WR4000;0;W10;N;X;Q |
| >PC3:S3;X |

| TESTSCENARIO 4: |
| --- |
|   PC1:S4;WDi;D(PC3);W200;N;X |
|   PC2:S4;0;WDi;D(PC3);W500;N;X |
| >PC3:S4;WBe;0;W530;N;X;Q |

| TESTSCENARIO n: |
| --- |
|   PC1:Sn; ---------------------- |
|   PC2:Sn; ---------------------------- |
| >PC3:Sn; ------------------ |

FIG. 6

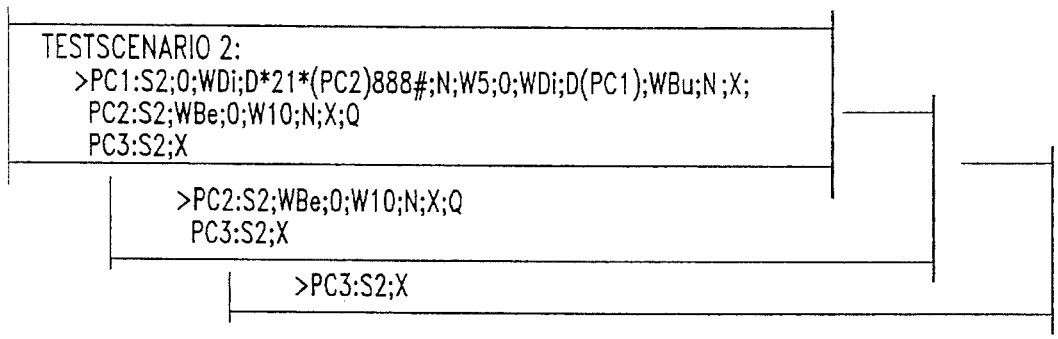

TESTSCENARIO 2:
>PC1:S2;O;WDi;D*21*(PC2)888#;N;W5;O;WDi;D(PC1);WBu;N;X;
PC2:S2;WBe;O;W10;N;X;Q
PC3:S2;X

>PC2:S2;WBe;O;W10;N;X;Q
PC3:S2;X

|  | PROGRAM PC1 | PROGRAM PC2 | PROGRAM PC3 |
|---|---|---|---|
| TESTSCENARIO 1 | SUBSCENARIO 1/PC1 (=Programstep 1) | SUBSCENARIO 1/PC2 (=Programstep 1) | SUBSCENARIO 1/PC3 (=Programstep 1) |
| TESTSCENARIO 2 | SUBSCENARIO 2/PC1 (=Programstep 2) | SUBSCENARIO 2/PC2 (=Programstep 2) | SUBSCENARIO 2/PC3 (=Programstep 2) |
| TESTSCENARIO 3 | SUBSCENARIO 3/PC1 (=Programstep 3) | SUBSCENARIO 3/PC2 (=Programstep 3) | SUBSCENARIO 3/PC3 (=Programstep 3) |
| TESTSCENARIO 4 | SUBSCENARIO 4/PC1 (=Programstep 4) | SUBSCENARIO 4/PC2 (=Programstep 4) | SUBSCENARIO 4/PC3 (=Programstep 4) |
| ⋮ | ⋮ | ⋮ | ⋮ |
| TESTSCENARIO n | SUBSCENARIO n/PC1 (=Programstep n) | SUBSCENARIO n/PC2 (=Programstep n) | SUBSCENARIO n/PC3 (=Programstep n) |

TEST

SYSTEM FOR TESTING THE BILLING FUNCTION IN A TELECOMMUNICATION SYSTEM

BACKGROUND OF THE INVENTION

The present invention relates to a system for testing a telecommunication system, in particular a public telephone system, for correctly subscribers.

SUMMARY OF THE INVENTION

The test system according to the present invention comprises a number of simulation units which are connected to the telecommunication system via normal subscriber lines. Each of the simulation units comprises an independent control unit which is controlled by a control program. The control program consists of a number of program steps which are each provided with a start code for starting that program step. Each program step is executed after the control unit detects an internally or externally generated start code signal which is identical to the start code valid for that program step. The start code signals and the various start codes are identical in all simulation units. The simulation units simulate subscribers, either A subscribers or B subscribers. The system is intended to test the telecommunication system, for example, the reliability thereof with respect to the billing costs. In particular, the system has been developed by the applicant to test whether a new service, such as "itemized billing", functions correctly in all circumstances. Thus, it may be important to know how such provisions function in practice, if, for example, an A subscriber calls a B subscriber who, in the same instant, has himself started a call. It is also possible, apart from such status changes (in this case of the B subscriber), for settings of A or B subscribers to play a part in the functioning of the cost billing function, for example a setting to "call forwarded to another subscriber number". Each of the simulation units is therefore provided with a control means (the control unit together with the control program) by means of which successively different statuses and/or settings can be simulated. Thus, it is possible to simulate successively the statuses "B subscriber engaged", "B subscriber free but does not pick up", "B subscriber free but picks up at the same instant that a call reaches him", "A subscriber wants to dial but is called at the same instant" etc. The same simulation unit can alternately simulate an A or a B subscriber set. It is also possible to simulate different settings of the subscriber set, such as "call forwarded to another subscriber number", and so on. The entire test consists of a number of test scenarios which each consist of a number of subscenarios matched to one another, which are distributed over the various simulation units and are stored therein. Such a subscenario comprises a sequence of instructions (an instruction set) which one simulation unit has to execute. The entire program of the simulation unit comprises a number of those subscenarios or program steps which, together with the subscenarios in the various other simulation units, form the test scenarios. The test scenarios together form the test to which the telecommunication system is subjected. The execution of the subscenarios which belong to the same test scenario takes place simultaneously, and the start thereof (and in some scenarios also one or more very time-critical instructions within such a scenario) has to be synchronized. That synchronization takes place by means of the start code signal. That start code signal can be generated internally or externally. It is important that the start code signal in all the simulation units at each instant is identical, and that the start codes of all the subscenarios belonging to the same test scenario—which subscenarios are therefore executed simultaneously in the various simulation units—are identical. As soon as the control unit of a simulation unit detects that, at a certain moment, the start code signal (whose value has changed) is identical to the start code of one of its subscenarios (program steps), the control unit starts execution of that subscenario. Simultaneously, the control units in the remaining simulation units detect identity between the start code signal and the start code of their subscenario belonging to the same test scenario (after all, the start code signal is identical in all the simulation units, and the start codes of all the program steps belonging to the same test scenario are identical).

Preferably, both the start code signal and the start codes comprise a time code. The start code signal is, for example, a time code signal (changing with time) and the subscenarios are started as soon as the time code of the start code signal is identical to the (fixed) time code of the start code. All the subscenarios thus commence at precisely the same moment, previously laid down in the test scenario.

As the ability is required to position the various simulation units at large distances from each other, given the large extensiveness of the telecommunication system, the start code signal or an auxiliary signal for the internal generation, by the simulation units, of the start code signal is preferably transmitted without the use of wires. To this purpose, for example, a radio time signal such as the DCFF77 signal is used.

The start code signal can be generated internally or externally. For example, in each simulation unit, during an initialization step, an internal clock is set to the DCF77 clock. If the internal clocks of all the simulation units are sufficiently accurate, the internal clock signal, after this initialization step, can serve as the time-coded start code signal. Another option is, as stated earlier, to derive the start code signal at all times from an external signal such as the DCF77 signal to be received without the use of wires.

BRIEF DESCRIPTION OF THE DRAWINGS

FIG. 3 shows an example of a complete test, consisting of n test scenarios.

FIG. 4 shows a program, derived from the complete test from FIG. 3, for a first simulation unit, FIG. 5 for a second simulation unit and FIG. 6 for a third simulation unit, all consisting of various program steps (subscenarios) to be carried out simultaneously.

FIG. 7 shows a compilation of the program steps of the first, the second and the third simulation unit which belong to the second test scenario.

FIG. 8 shows, in diagrammatic form, the relationship between the complete test, the test scenarios, the programs of the simulation units, the subscenarios and program steps.

DETAILED DESCRIPTION

Figure 1:
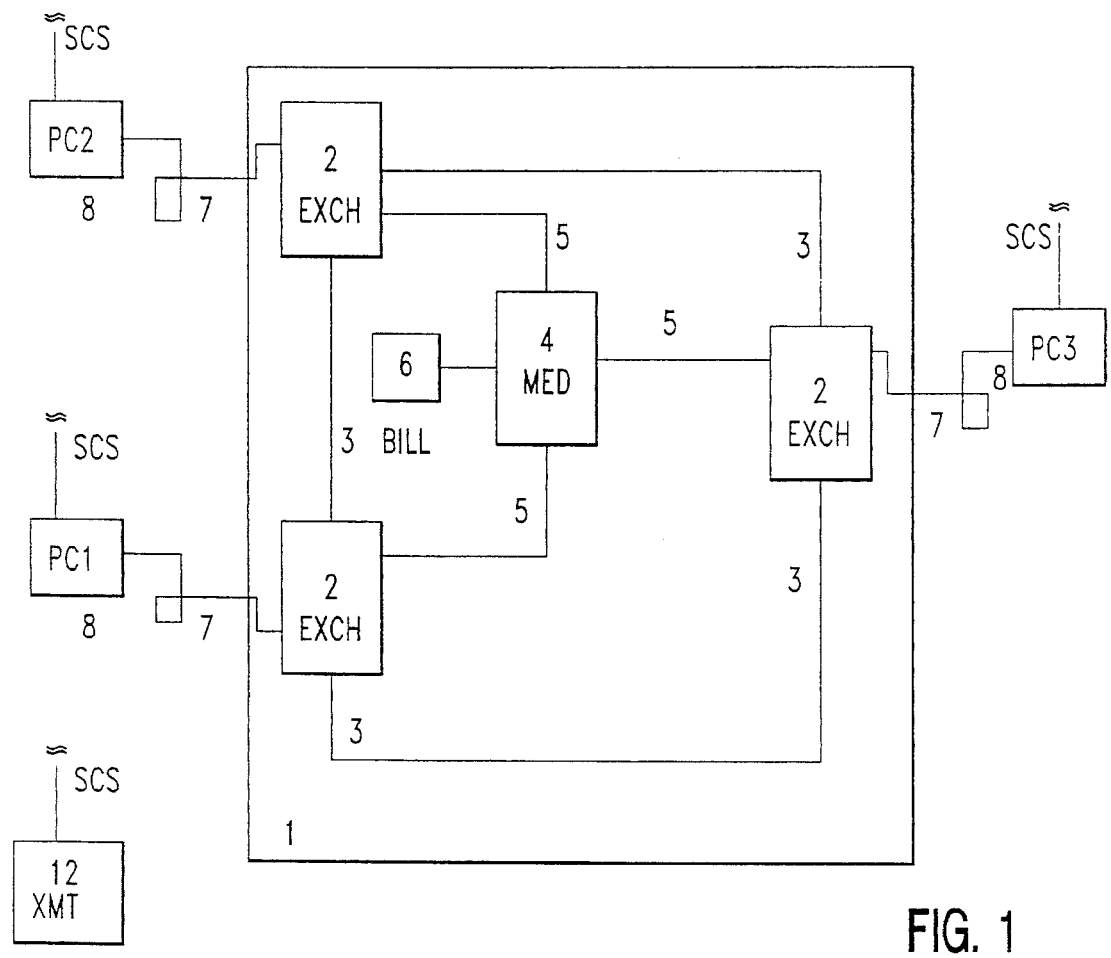
FIG. 1 shows a telecommunication system and, connected thereto, a number of simulation units which can receive a wireless time code signal.

FIG. 1 presents, in diagrammatic form, the mode of operation of the invention. In a network 1, for example a public telephone network, comprising a transmission network with switching centers and subscriber exchanges 2, the usage cost billing is carried out by a "mediation" 4 calling up (via a transmission path 5) at set times from the various subscriber exchanges 2 "call records" in which the data are stored of calls and connections which have been initiated by A subscribers connected to that exchange 2. The call records collected by the mediation 4 are then processed by a "billing center" 6 into (specified) bills which are presented to the A subscribers. All this is described more extensively in a patent application Ser. No. 08/229,467, abandoned, which is a continuation of Ser. No. 08/074,058, abandoned) already filed earlier by Applicant, which application in particular deals with an improved method for transmitting the call records to the mediation. Subscribers can communicate with one another via the subscriber exchanges 2, which are connected to one another via the transmission network, presented in the figure by transmission path 3. Both connections, 3 and 5, can be implemented via the same transmission network, but it is also possible to let the transmission path 5 run via the so-called signalling network; the choices made in this context are of no importance for the understanding of the present invention. Connected to all the subscriber exchanges 2, are a large number of subscribers, via subscriber lines 7. It is important that each connection or connection attempt between subscribers is billed in a completely correct manner. For that reason it is necessary, in the case of far-reaching changes, for example installation of new control software or changes in the parameter settings in the exchanges 2 or in the event of changes in the specifications of the connection paths 7 or 3, the telecommunication system 1 has to be subjected to stringent tests. As a wide range of possibilities may arise when connections are made between subscribers, both on the part of the A subscriber and on the part of the B subscriber, it is necessary to take all those possibilities into account for a stringent test of this type; in other words, the actual mode of operation of the billing system must be examined for all those different conditions. This then is done by making use of a number of simulation units 8 (PC1, PC2, PC3) which are able to simulate various behaviours, statuses and set-tings of subscriber sets. Said simulation units 8 are each formed by a PC which is provided with a simulation program which consists of various program steps. The complete test consists (see also FIG. 8) of a (large) number of test scenarios which are executed consecutively. Each test scenario consists of a number of program steps (subscenarios, sub-programs), to be executed simultaneously, in the various PCs. In other words, test scenario x comprises program step x of the simulation program of PC1, program step x of the simulation program of PC2, program step x of the simulation program of PC3 etc. All the program steps x, —together with the distributed test scenario x—must be executed simultaneously, i.e. they must start at the same moment (in some cases, even single instructions within such a scenario must start at the same time, which can be specified by a (preceding) WRt or WAT instruction, which are described later). All the program steps x are therefore preceded by a start code Sx. A transmitter 12 transmits start code signals SCS which can be received by all the PCs, via a small receiver. The transmitted start code signals are compared in the PCs with start codes incorporated in their simulation program. If there is agreement between the received start code signal and one of the start codes (Sx) from the simulation program, the program step (x) which follows that start code is executed. It should be noted that the term program step is therefore used here for a part of the simulation program as loaded into the PC; a program step thus consists (generally) of several instructions and then comprises several lines of source code text.

During the execution of a program step, each PC simulates a particular subscriber set with particular behaviour, settings etc. The complete test therefore consists of a succession of test scenarios which each determine the behaviour of the various simulation units and thus each simulate the simultaneous behaviour of different subscribers.

The test scenarios are described by means of a formal description language, developed for this purpose by the applicant, which consists of a number of instructions. Each instruction corresponds to an elementary action during phoning. The instructions can be executed independently by the simulation units. The most important instructions are:

Sx(T) Start (sub)scenario x at time T(yy-mm-dd;hh:mm:ss.xx)

O pick up receiver

N put down receiver

Dxxx . . . dial "number" xxx . . . ; (x=0 . . . 9, *, #)

Wn wait for n sec. (default n=1)

WAT wait for time T(yy-mm-dd;hh:mm:ss.xx)

WDi wait for dial tone

WBu wait for engaged (i.e., off hook) tone

WCo wait for busy tone

WBe wait for ringing tone

WDT wait for DTMF tone

WRt wait for t msec. after commencement of (sub)scenario

X end of subscenario

Q end of scenario

Note: The instruction Sx(T) in fact has the same syntax as the instruction WAT, namely the time designation yy-mm-dd;hh:mm:ss.xx; in the first case (Sx(T)) is used to specify the starting moment for executing an instruction set (program step, (sub)scenario), in the last case (WAT) is used to record the exact (absolute) starting moment for the execution of an instruction within such an instruction set. Often it will be possible, however, within the instruction sets, to make use of the instruction WRt which specifies a starting moment for an instruction which is related to the starting moment of the current instruction set.

Using the above instructions—by means of which subroutines can be called in a lower programing language—test scenarios can be described which can be executed independently by the PCs, such as, for example, the following test scenarios:

TEST SCENARIO 1:

Specification: Conversation of 30 sec. between subscribers A and B; subscriber B breaks the connection first.

Instructions PC1: S1; O; WDi; D(tel. no. PC2); WBu; N; X

Meaning: Wait for time S1, i.e. for the moment when the internal or external clock time is equal to the time value of S1; Pick up receiver; Wait for dial tone; Dial tel. no. of B subscriber (PC2); Wait for engaged tone (owing to B breaking the connection); Put down receiver.

Instructions PC2: S1; WBe; O; W30; N; X; Q

Meaning: Wait for time S1; Wait for ringing tone; Pick up receiver; Wait for 30 sec.; Put down receiver;

TEST SCENARIO 2:

Specification: Wrong activation of call-forwarding service (*21 service) from A to B.

Instructions PC1: S2; 0; WDi; D*21*(tpno PC2)888#; N; W5; 0; WDi; D(tpno PC1); WBu; N; X; Meaning: Wait for time S2; Pick up receiver; Wait for dial tone; Dial *21* (tpno. B subscriber (PC1)888# (as a result of the suffix 888 after own telephone number, the *21 action, the intended call forwarding from the own telephone number, must not take place); Put down the receiver; Wait for 5 sec.; Pick up the receiver again; Wait for dial tone; Dial own telephone number (PC1); Wait for engaged tone (if PC1's own number should be subject to call-forwarding, PC1 does not get an engaged tone); Put down the receiver. Instructions: PC2: S2; WBe; O; ; W10; N; X; Q Meaning: Wait for time S2; Wait for ringing signal (if the call-forwarding action of PC1 had been successful, ringing signal would be detected at PC2 when PC1 dials its own number whose calls have been forwarded to PC2); Pick up receiver; Wait for 10 sec.; Put down receiver.

TEST SCENARIO 3:

Specification: A subscriber rings B subscriber; A puts down his receiver 0.1 sec. before B picks up the receiver.

Instructions PC1: S3; O; WDi; D(PC2); WR39900; N; X

Meaning: Wait for time S3; Pick up receiver; Wait for dial tone; dial subscriber B (PC2); Wait until 39.9 sec. after the start of this scenario; Put down receiver.

Instructions PC2: S3; WR40000; O; W10; N; X; Q

Meaning: Wait for time S3; Wait until 40.0 sec. after the start of this scenario; Pick up receiver; Wait for 10 sec.; Put down receiver.

TEST SCENARIO 4

Specification: subscriber A and subscriber B each ring subscriber C.

Instructions PCl: S4; O; WDi; D(PC3); W200; N; X

Meaning: Wait for time S4; Pick up receiver; Wait for dial tone; dial subscriber C (PC3); Wait for 200 sec.; Put down receiver.

Instructions PC2: S4; O; WDi; D(PC3); W500; N; X

Meaning: Wait for time S4; Pick up receiver; Wait for dial tone; dial subscriber C (PC3); Wait for 500 sec.; Put down receiver.

Instructions PC3: S4; WBe; O; W530; N; X; Q

Meaning: Wait for time S4; Wait for ringing signal; Pick up receiver; Wait for 530 sec.; Put down receiver.

Figure 2:
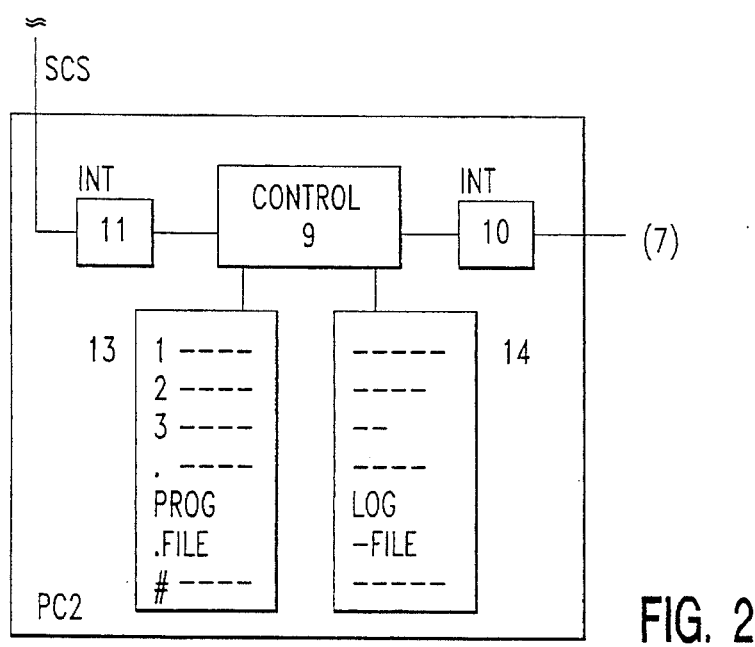
FIG. 2 shows, in diagrammatic form, an illustrative embodiment of a simulation unit.

In FIG. 2, one of the simulation units 8 is represented in diagrammatic form. The simulation unit 8 is formed by a PC, with a control unit 9 (CPU), an instruction file 13 held in a memory, a PC-telephone interface 10 to the telephone network 1 and an interface (including radio receiver) 11 to transmitter 12. The abovementioned instructions are incorporated in the instruction file 13. If the simulation unit presented in this figure is PC2, it would be sufficient to incorporate only those instructions which are intended for PC2 into the file 13. In practice, however, it is more convenient to incorporate the complete test scenario into the file (copy it to file 13) and, when it is being executed, to have only those instructions executed which are intended for PC2. In FIG. 3 et seq. the complete test scenario with programs for various simulation units is illustrated in more detail. In addition to the instruction file 13, a log file 14 is also provided in which, when the simulation program of file 13 is executed, both the signals transmitted to the network by the PC and the signals transmitted by the network, as a reaction thereto, to the PC are registered. The log files 14 of the various PCs on the one hand, and the call-record files in the subscriber exchanges 2 (or in the mediation 4 which, after all, collects the call records generated in the exchanges 2) on the other hand, may, after the PCs have executed all the test scenarios belonging to the test, be compared with one another by system experts, and the billing system can thus be evaluated and improved, if desired.

FIG. 3 shows a complete test described in formal language and consisting of n test scenarios, beginning with the test scenarios 1, 2, 3 and 4, described above in more detail, each consisting of actions to be carried out by PC1, PC2 and PC3. FIG. 4 shows the same scenarios as they have been incorporated into the instruction file 13 of PC1. It has been indicated, by means of a pointer, which instruction sets (subscenarios) have to be executed by PC1; these instructions are selected, read in and executed by the control unit 9. FIG. 5 shows the same test scenarios 1 . . . n, as incorporated into the file 13 of PC2; FIG. 6 shows these scenarios as incorporated into file 13 of PC3. The complete test scenario is thus at all times executed by all (three) PCs, each PC being provided with that complete scenario, but selecting therefrom and executing its own "part". FIG. 7, once more shows that (for example) scenario 2 consists of a task for PC1, a task for PC2 and a (non-active) task for PC3. As can be seen in FIGS. 3–6, PC3 has not been assigned an active part in the first three test scenarios, but it has been assigned an active part in the fourth test scenario.

The execution of the test scenarios on the various PCs is synchronized by a start code signal SCS which is emitted by transmitter 12. Use is made of a time-signal transmitter such as the known German DCF77 transmitter. This start code signal is picked up by the receivers 11 in the PCs 8 and passed to the control units 9. The start code S1 of the first test scenario has a certain time value T1. As soon as the control unit 13 establishes agreement between, on the one hand, the received (DCF77) time code signal (start code signal SCS) and, on the other hand, the time value of the start code S1 of the first test scenario incorporated in the file 13 (read out by the control unit 9), in each PC executes the subscenario 1 valid for that PC. Together, (collectively) the PCs thus execute the first test scenario. Both the instructions (code signals) passed to the telephone network 1 and the signals received from that network 1 are billed and written to the log file 14, so that afterwards, during the evaluation of the billing function of the telecommunication system, the entire course of the simulation process on the user side can be observed and compared with the course of the same process on the network side. When the scenario 1 has terminated ("Q"), all the PCs wait to receive a DCF77 code which is identical to the time value of start code S2, of the second test scenario whereupon execution of test scenario 2 commences. After reception of a DCF77 time code signal which corresponds to the time value of start code S3 of the third test scenario, scenario 3 is started, etc. It should be noted that it is not strictly necessary to have all the scenarios started by the external DCF77 signal. If the PCs themselves have accurate internal clocks, it is also possible to compare the time values of the start codes S2 . . . Sn with the internal clock values, after those internal clocks have, though, been set to that external clock, for example when receiving the DCF77 code signal which is identical to the value of start code S1. It is also possible to synchronize the PC clocks prior to executing the first test scenario; in that case it is indeed possible to start scenario 1 with the aid of an internal clock signal.

The results of the executed test scenarios are found in the call records which have been produced in the various exchanges 2 to which the PCs are connected, and which are collected by the "mediation" 4. Based on this collection of call records on the one hand, and the interactions, consisting of the signals exchanged between the PCs and the telephone network 1, and written to the log file 14 of the PCs 8, on the other hand, system experts are able to assess the reliability of the telecommunication system 1 and, in particular, the usage billing function thereof which, with the aid of the test system described hereinabove, can be assessed and, if necessary, improved.

We claim:

1. A test system for testing a telecommunication system for correct billing of usage by subscribers, the test system comprising a plurality of simulation units arranged at different locations in the telecommunication system, each of the plurality of simulation units being connected to the telecommunication system via a normal subscriber line and including an independent control unit which is controlled by a control program, the control program including a number of program steps, each of the program steps being provided with a start code wherein, when the control unit detects an internally or externally generated start code signal which is identical to a start code of a program step, the control unit executes the program step, and wherein the start codes in one of the simulation units are identical to the start codes in another of the simulation units.

2. The test system according to claim 1, wherein the start codes and the start code signal comprise a time code.

3. The test system according to claim 1, wherein the start code signal is an externally generated radio signal and wherein each of the plurality of simulation units is provided with a receiving device for receiving the start code signal and passing the start code signal to the control unit.

4. The test system according to claim 1, wherein the start codes and the start code signal comprise a time code, the start code signal is an externally generated radio signal, each simulation unit is provided with a receiving device for receiving the start code signal and passing the start code signal to the control unit, and wherein the external start code signal is a DCF77 signal.

5. The test system according to claim 1 wherein at least one of the program steps includes at least two instructions.

6. A system for testing the billing of subscriber usage in a telecommunication system, the system comprising:

a) a first simulation unit coupled with the telecommunication system at a first location via a first subscriber line, the first simulation unit including
i) a first storage device storing a test program,
ii) a second storage device for storing information transmitted between the first simulation unit and the telecommunication system, and
iii) a controller for executing the test program stored in the first storage device; and b) a second simulation unit coupled with the telecommunication system at a second location via a second subscriber line, the second simulation unit including
i) a first storage device storing the test program,
ii) a second storage device for storing information transmitted between the second simulation unit and the telecommunication system, and
iii) a controller for executing the test program stored in the first storage device of the second simulation unit, wherein the controllers of the first and second simulation units execute a section of the test program upon receipt of a start code signal.

7. The system of claim 6 wherein the test program includes a plurality of test scenarios, each of the plurality of test scenarios including at least one program step, the one program step having an associated start code and being executed when the start code signal received by the controllers of the first and second simulation units matches the start code associated with the one program step.

8. The system of claim 6 wherein the test program includes program steps selected from a group consisting of: a start at a specified time step; a pick up receiver step; a put down receiver step; a dial a specified number step; a wait for a specified time period step; a wait for a specified time step; a wait for dial tone step; a wait for an off-hook tone step; a wait for a busy tone step; a wait for a ringing tone step; a wait for a DTMF tone step; a wait for a specified time from execution step; an end of sub-test step; and an end of test step.

9. The system of claim 6 wherein the controller of the first simulation unit only executes sections of the test program that are associated with the first simulation unit and the controller of the second simulation unit only executes sections of the test program that are associated with the second simulation unit.

10. The system of claim 6 wherein the test program includes a plurality of sub-tests.

11. The system of claim 10 wherein each of the plurality of sub-tests includes at least one program step.

12. The system of claim 11 wherein the at least one program step has an associated start code.

13. The system of claim 12 wherein the controller of the first simulation unit executes the at least one program step when a start code signal, which matches the associated start code, is received by the first simulation unit.

14. The system of claim 6 further comprising a transmitter for transmitting start code signals wherein each of the first and second simulation units includes a device for receiving start code signals transmitted by the transmitter.

\* \* \* \* \*